(12) United States Patent
Pasuri et al.

(10) Patent No.: US 8,581,528 B2
(45) Date of Patent: Nov. 12, 2013

(54) ARRANGEMENT AND METHOD FOR CONTROLLING FREQUENCY CONVERTER MODULES

(75) Inventors: Osmo Pasuri, Ojakkala (FI); Ilkka Tunkkari, Espoo (FI)

(73) Assignee: ABB Oy, Helsinki (FI)

( * ) Notice: Subject to any disclaimer, the term of this patent is extended or adjusted under 35 U.S.C. 154(b) by 373 days.

(21) Appl. No.: 13/084,858

(22) Filed: Apr. 12, 2011

(65) Prior Publication Data
US 2011/0254473 A1    Oct. 20, 2011

(30) Foreign Application Priority Data

Apr. 15, 2010    (FI) ..................................... 20105395

(51) Int. Cl.
*H02P 1/54*    (2006.01)
(52) U.S. Cl.
USPC ................. 318/51; 318/34; 318/50; 318/112
(58) Field of Classification Search
USPC ........ 318/34, 41, 50, 51, 66, 67, 112; 307/18, 307/29, 37, 38, 43, 45, 82
See application file for complete search history.

(56) References Cited

U.S. PATENT DOCUMENTS

| | | | | |
|---|---|---|---|---|
| 4,661,714 A * | 4/1987 | Satterthwaite et al. | ....... | 290/4 R |
| 6,188,591 B1 | 2/2001 | Rüter et al. | | |
| 7,439,634 B2 * | 10/2008 | Michalko | ........................ | 307/43 |
| 7,609,022 B2 * | 10/2009 | Oyobe et al. | .................. | 318/800 |
| 7,737,577 B2 * | 6/2010 | Langlois et al. | ................ | 307/19 |
| 7,952,306 B2 * | 5/2011 | Wright et al. | ................. | 318/146 |
| 7,960,939 B2 * | 6/2011 | Steimer | ........................ | 318/803 |
| 2004/0069251 A1 | 4/2004 | Rzadki | | |
| 2005/0146305 A1 | 7/2005 | Kneller | | |
| 2008/0100136 A1 | 5/2008 | Langlois et al. | | |

FOREIGN PATENT DOCUMENTS

| | | |
|---|---|---|
| CN | 2478281 Y | 2/2002 |
| CN | 1949660 A | 4/2007 |
| CN | 201260148 Y | 6/2009 |
| DE | 198 21 251 A1 | 11/1999 |
| JP | 06121473 A | 4/1994 |
| JP | 2004-192693 A | 7/2004 |

OTHER PUBLICATIONS

Finnish Search Report, dated Jan. 4, 2011 for Finnish Patent Application No. 20105395.
S. Kanerva et al., "State of the Art in Electric Propulsion-Viewpoint on Redundancy", Electric Ship Technologies Symposium, 2009. ESTS 2009. IEEE Apr. 20, 2009, pp. 499-504. ISBN 978-1-4244-3438-1; ISBN 1-4244-3438-6.
Chinese Office Action issued on Aug. 1, 2013 by the Chinese Patent Office in corresponding Chinese Patent Application No. 201110096349.6 and English translation thereof.

* cited by examiner

*Primary Examiner* — Bentsu Ro
*Assistant Examiner* — Thai Dinh
(74) *Attorney, Agent, or Firm* — Buchanan Ingersoll & Rooney PC

(57) ABSTRACT

An arrangement for controlling frequency converter modules of an electric drive. In the arrangement, the frequency converter modules are arranged to control alternatively a first motor or several motors having less power than the first motor.

24 Claims, 4 Drawing Sheets

US 8,581,528 B2

ARRANGEMENT AND METHOD FOR CONTROLLING FREQUENCY CONVERTER MODULES

RELATED APPLICATION

This application claims priority under 35 U.S.C. §119 to Finnish Patent Application No. 20105395 filed in Finland on Apr. 15, 2010, the entire content of which is hereby incorporated by reference in its entirety.

FIELD

The present disclosure relates to frequency converters. More particularly, the present disclosure relates to arrangements in which a high-power frequency converter may be divided into a plurality of low-power frequency converters and, as a result, various loads may be connected to them.

BACKGROUND INFORMATION

An electric drive can include at least a power stage, a control means for controlling the power stage, and a load, the operation of which is controlled by the power stage and the control means thereof. The power stage and its control are herein referred to as a frequency converter. At its simplest, such an arrangement may be, for instance, a motor that is rotated by a frequency converter, which is controlled by a control card. If necessary, power stages may be connected in parallel to control the same load. The power stages may thus be controlled by the same control means.

In certain processes, a high-power frequency converter including a plurality of power stages may be used for controlling one heavy load for some time, and when this heavy load is not needed, the same power stages may be utilized for providing a plurality of lower power frequency converters. It is thus not necessary to provide each load with its own frequency converter. This saves costs and space.

However, it is difficult to manage such an arrangement by applying known techniques. The configuration of various combinations of control means and electric machines may be complicated and subject to errors.

SUMMARY

An exemplary embodiment of the present disclosure provides an arrangement for controlling frequency converter modules of an electric drive. The exemplary arrangement includes two or more control means, two or more frequency converter modules, and two or more loads. The exemplary arrangement also includes switching means for connecting the frequency converter modules to different loads of the arrangement, respectively, selection means for selecting active control means, and first branching means and second branching means. The first branching means are configured to establish connections between each control means and one or more second branching means, and the second branching means are configured to establish connections between each frequency converter module and one or more first branching means in such a manner that the second branching means comprise at least one branching device arranged to establish a connection between a frequency converter module and two or more first branching means.

An exemplary embodiment of the present disclosure provides a method for controlling frequency converter modules in connection with an electric drive arrangement. The arrangement includes two or more control means, two or more frequency converter modules, two or more loads, and one or more switching means for connecting the frequency converter modules to the different loads of the arrangement. The exemplary method includes the steps of: selecting active control means by which the frequency converter modules are controlled; selecting loads loading the frequency converter modules by means of the switching means; establishing a connection between each control means and one or more frequency converter modules for controlling the frequency converter modules by branching the connection from each control means to one or more connections and combining one or more afore-mentioned branched connection into one connection to the frequency converter module; and controlling the frequency converter modules loaded by the loads by means of the control means.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and an arrangement for controlling frequency converter modules of an electric drive, which resolve the above-noted drawbacks of known techniques.

Exemplary embodiments of the present disclosure are based on the concept of replacing control means controlling frequency converter modules by means of branching means. As used herein, a frequency converter module refers to a module that includes a power stage and may be controlled by the control means. The branching means combines the connections from the control means to the frequency converter modules into one connection. In addition, loads loading the frequency converters may be selected by switching means.

The exemplary embodiments of the present disclosure advantageously provide user-friendliness, which can be achieved with low costs. Also, error susceptibility decreases with respect to the known techniques.

Figure 1:
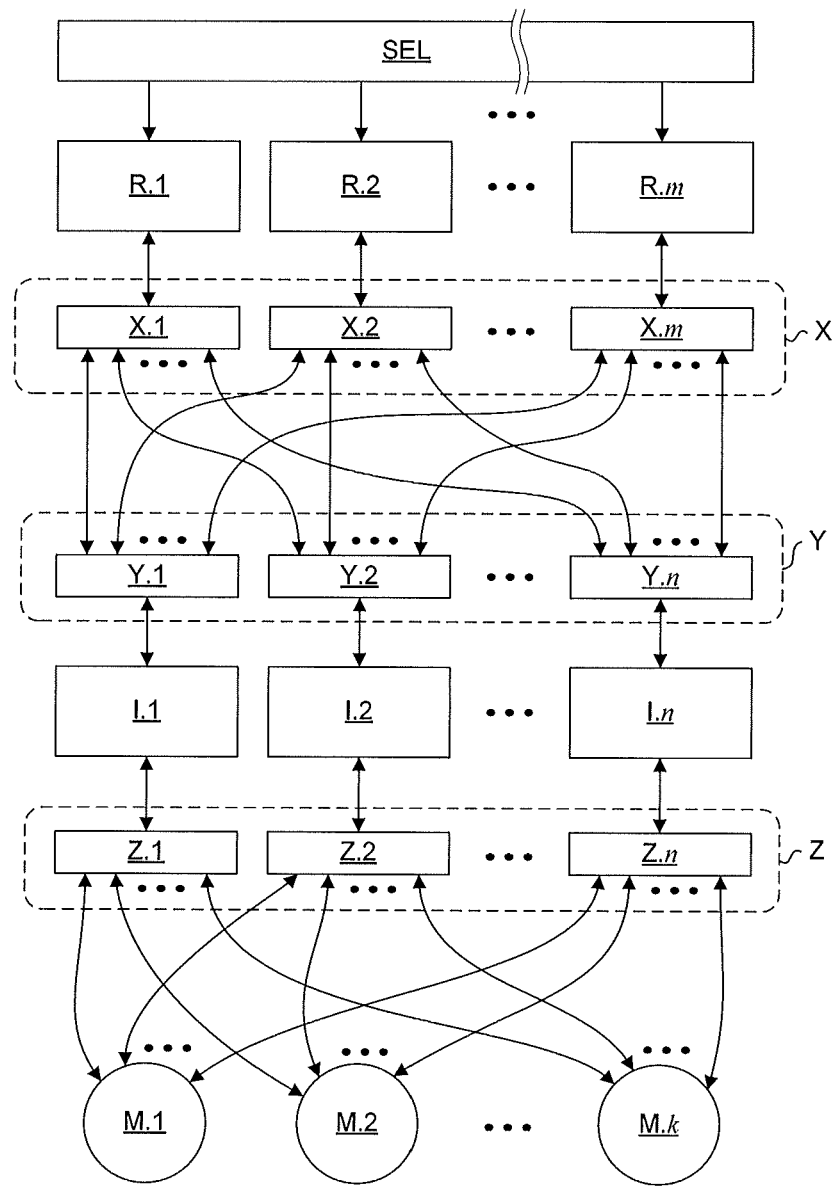
FIG. 1 shows a simplified block diagram of an arrangement for controlling frequency converter modules according to an exemplary embodiment of the present disclosure.

FIG. 1 shows a simplified block diagram of an arrangement according to the present disclosure for controlling frequency converter modules. The arrangement includes at least two control means R.1 to R.m (m≥2) for controlling the frequency converter modules. Of these control means, the active ones are selected by selection means SEL. The arrangement also includes two or more frequency converter modules I.1 to I.n (n≥2) and two or more loads M.1 to M.k (k≥2). The frequency converter modules I.1 to I.n are connected to the loads by switching means Z, the number n of which corresponds to that of frequency converter modules. The connection means Z may be used for selecting the frequency converter module(s) supplying power to each load. In other words, the load to which the frequency converter module supplies power is selected by the switching means. Each switching means Z.1 to Z.n is arranged to establish a connection between one frequency converter module I.1 to I.n and one load M.1 to M.k at a time. An individual switching means Z.1 to Z.n may also refer to a direct connection between a frequency converter module and a load.

In addition, the exemplary arrangement of the present disclosure as illustrated in FIG. 1 includes first branching means X and second branching means Y for establishing connections between the control means R.1 to R.m and the frequency converter modules I.1 to I.n. The first branching means X include m first branching means, and the second branching means Y include n second branching means. The second branching means Y include at least one branching device, by which a connection may be established between a frequency converter module and two or more first branching means. Such a branching device may be, for example, an optical passive branching unit or an electric device by which the functionality of an optical branching unit may be implemented between a frequency converter module and two or more first branching means X.1 to X.m. Connections may also be electric, in which case the branching device implements the functionality of an electric branching unit. In addition, combinations of optical and electric connections are possible. An example is a branching unit, by which an electric connection is branched to several optical connections. Similar branching devices may also be used in the first branching means X.

Each control means R.1 to R.m is connected to a first branching means X.1 to X.m. Each first branching means X.1 to X.m serves to establish a connection between each control means R.1 to R.m and one or more second branching means Y.1 to Y.n. The first branching means X.1 to X.m may be adapted to convert a connection from an individual control means R.1 to R.m into several connections. Thus, it is possible to use one control means R.1 to R.m for controlling a plurality of frequency converter modules I.1 to I.n. As used herein, a connection can refer to a uni- or bidirectional data transmission connection. The first branching means X.1 to X.m may be simplified as a direct connection, if there is only one connection to the second branching means Y. A direct connection can refer to, for example, an optical fiber or a pair of optical fibers from one of the control means R.1 to R.m to one of the second branching means Y directly. Instead of an optical connection, a direct connection may also be an electric connection, such as a connection realized by copper conductors.

Like the first branching means X, the second branching means Y serve to establish a connection between each frequency converter module I.1 to I.n and one or more first branching means X. Each frequency converter module I.1 to I.n is connected to a second branching means Y.1 to Y.n. As in the above, the second branching means Y.1 to Y.n may be simplified as a direct connection, if there is only one connection to the first branching means X. However, the second branching means Y always include at least one branching device, by which a connection may be established between a frequency converter module and two or more first branching means.

Figure 2:
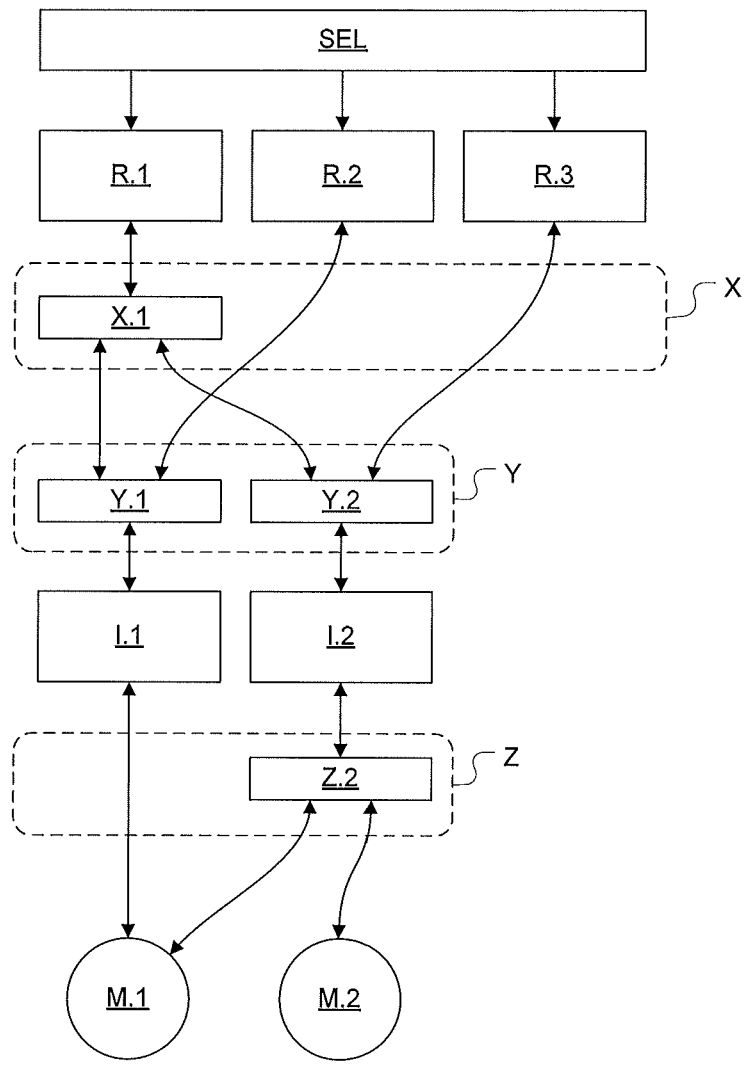
FIG. 2 shows an exemplary embodiment of the present disclosure in which some of first and second branching means are simplified as direct connections.

FIG. 2 shows an exemplary embodiment of the present disclosure, in which the control means R.1 controls both frequency converter modules I.1 and I.2 in the first operating mode. The first branching means X.1 branches the connection to the branching means Y.1 and the branching means Y.2, from which there are connections to the frequency converter modules I.1 and I.2. Power is supplied to the load M.1 by both frequency converter modules I.1 and I.2, because in this operating mode a switching means Z.2 is in a state where there is a connection from the frequency converter module I.2 to the load M.1. No power is supplied to the load M.2. In the second operating mode, control means R.2 and R.3 are active. The control means R.2 controls the frequency converter module I.1 supplying power to the load M.1. The control means R.3 controls the frequency converter module I.2 supplying power to the load M.2, because the switching means Z.2 is in a state where there is a connection from the frequency converter module I.2 to the load M.2. The first branching means X.1 is a branching device, and the second and third of the first branching means X are simplified as direct connections in this embodiment. The active control means are selected by a selection means SEL.

The switching means Z for loads may be in connection with the selection means SEL for control means and act responsive to the selection means. In this case, simultaneously with selecting the operating mode for the control means, the operating mode for the switching means may also be selected. It is thus possible to choose the operating mode of the entire arrangement with one select operation.

When the branching device is an electric device, it can be configured in such a manner that the operating mode of that particular branching means may also be selected. For instance, the second branching means Y may be configured to operate responsive to the selection means SEL. When the branching means obtains the selection information, it may establish a point-to-point connection, for example. The branching means thus serves as a selector, by which, for instance in the case of the second branching means, the control means controlling the frequency converter module can be selected. When the branching means serve as a selector, the control means need not necessarily be activated separately.

Figure 3:
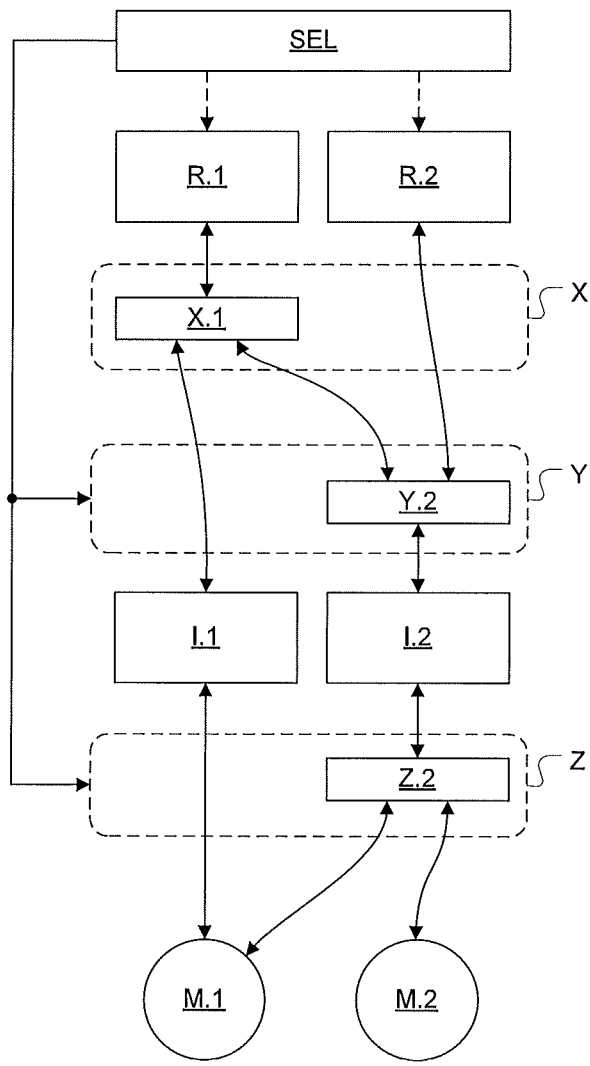
FIG. 3 shows an exemplary embodiment of the present disclosure in which a second branching means and switching means are controlled by selection means.

FIG. 3 shows an exemplary embodiment of the present disclosure, in which the selection means SEL are used for controlling the second branching means Y and the switching means Z. The operating modes of the exemplary embodiment illustrated in FIG. 3 correspond to those shown in FIG. 2. In the first operating mode, the load M.1 is supplied by the frequency converter modules I.1 and I.2, which are controlled by the control means R.1. In this exemplary embodiment, unlike in FIG. 2, the frequency converter module I.1 is controlled by the control means R.1 and the frequency converter module I.2 by the control means R.2 in the second operating mode. The second branching means connected to the frequency converter module I.1 is simplified as a direct connection, and thus the frequency converter module I.1 is always controlled by the control means R.1. The second frequency converter module I.2, for its part, is controlled by either the control means R.1 (the first operating mode) or the control means R.2 (the second operating mode). The second branching means Y.2 is configured in such a manner that it can be used for selecting which one of the afore-mentioned control means controls the frequency converter module I.2. The selection means SEL are used for selecting the mode of the second branching means Y and that of the switching means. If necessary, it is also possible to control the control means directly by means of the selection means SEL by setting them active or inactive, for instance.

The branching means in the first and second branching means may also include a plurality of electric devices, optical branching units and/or electric branching units connected to one another. The first and second branching means may also be integrated into a device implementing the functionality of both branching means.

The exemplary arrangement according to the present disclosure may also serve as a generator drive, in which case the load serves as a generator and power is directed from the load to the frequency converter. From the frequency converter, power may be supplied forward to a mains system, for example.

Figure 4:
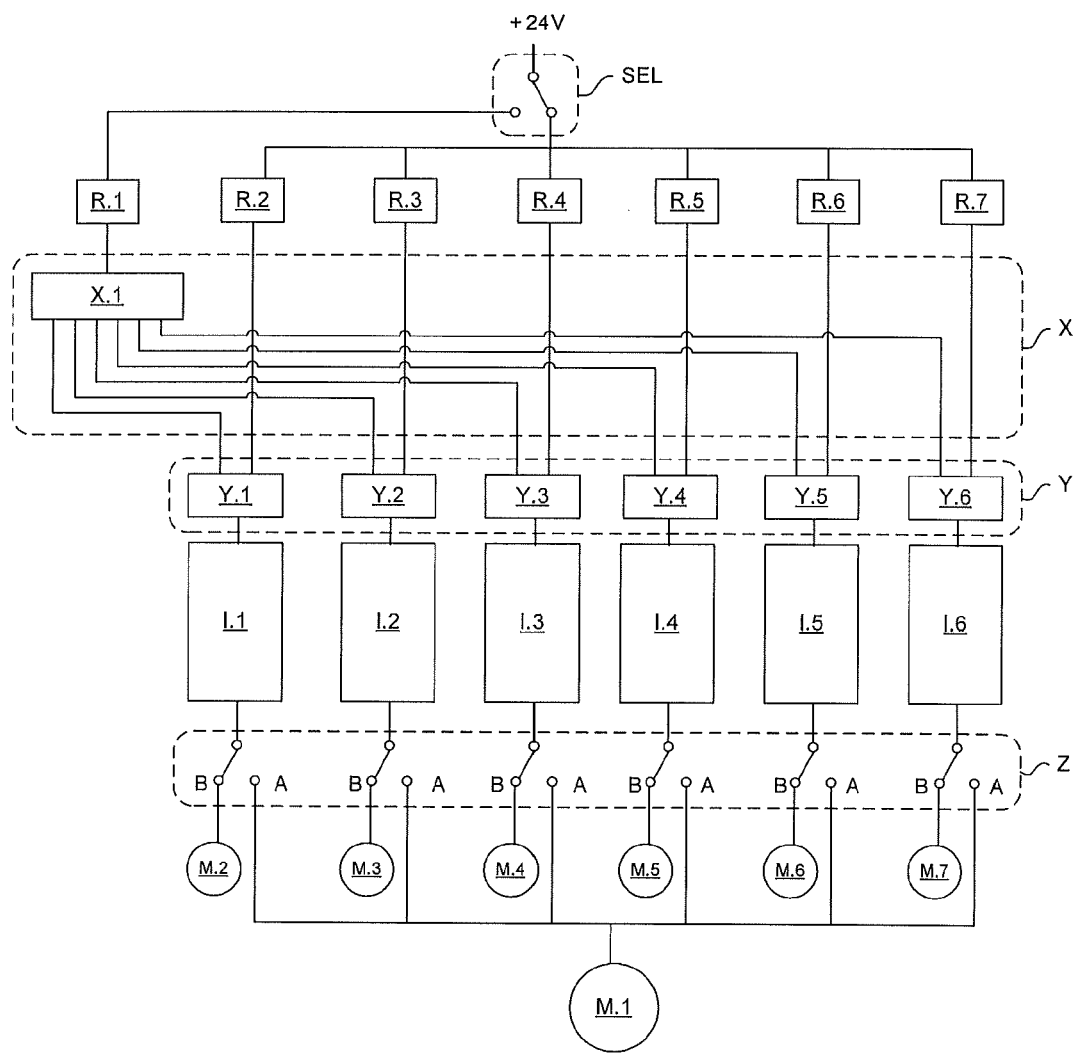
FIG. 4 shows an exemplary embodiment of the present disclosure for use in ships.

FIG. 4 shows an exemplary embodiment of the present disclosure for use in ships, for example. The selection means may be used for selecting an operating mode in which six frequency converter modules I.1 to I.6 are connected in parallel for supplying a ship propeller drive M.1, or an operating mode in which each frequency converter module is connected to its own motor M.2 to M.7 rotating a belt conveyor drive used for unloading cargo. The selection means SEL for the control units is a switch, which may be used for selecting which control units are supplied with electric power and are thus active. Electric power is supplied to a control means R.1 or a group of controls means R.2 to R.6.

Each frequency converter module I.1 to I.6 of the embodiment is connected via an optical fiber to the branching devices serving as second branching means Y.1 to Y.6. These branching devices may be implemented by a passive optical Y branching unit, where light arriving at the input is distributed to the outputs. Alternatively, the branching devices may also be implemented by an electric device. The control means R.1 is connected via an optical fiber to a branching device serving as the first branching means X.1. It may be implemented by an afore-mentioned electric device, for instance.

When the arrangement is used in an operating mode in which the control means R.1 is active, the control means R.1 controls the frequency converter modules I.1 to I.6 by means of connections established by the first branching means X.1 and the second branching means Y.1 to Y.6. The first branching means X.1 branches the connection from the control means R.1 to the second branching means Y.1 to Y.6. The second branching means Y.1 to Y.6 may also transmit information to the inactive control means R.2 to R.7. However, since they are inactive, they do not react to the information. In this operating mode, the switching means Z are set to mode A, whereby the frequency converter modules I.1 to I.6 are connected in parallel to supply the ship propeller drive M.1.

When the arrangement of the exemplary embodiment illustrated in FIG. 4 is once again in the operating mode in which the control means R.2 to R.7 are active, each control means R.2 to R.7 controls its own frequency converter module I.1 to I.6 in accordance with FIG. 4. By means of the second branching means Y, six point-to-point connections are established between the control means R.2 to R.7 and the frequency converter modules I.1 to I.6. In this operating mode, the switching means Z are set to mode B, whereby each frequency converter module I.1 to I.6 is connected to its own motor M.2 to M.7. Thus, the same frequency converter modules I.1 to I.6 may be used for providing one high-power drive, or it may be used as a lower power drive (⅙ of the high-power drive) by controlling each module separately.

Components of the exemplary embodiments were described above as "means" for conciseness of explanation. It is to be understood that each of the means elements described herein can be constituted by appropriately configured hardware (analog and/or digital) elements for carrying out their respective functions as described. The hardware elements constituting the various means elements of the present disclosure can also be implemented by a computer processor programmed to carry out the respective functions of the various elements. In this case, the computer processor is configured to execute a computer program tangibly recorded on a non-transitory computer-readable recording medium (e.g., non-volatile memory such as ROM, hard disk drive, optical memory, flash memory, etc.).

It is obvious to a person skilled in the art that the basic idea of the disclosure may be implemented in many different ways. The disclosure and its embodiments are thus not restricted to the examples described above, but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An arrangement for controlling frequency converter modules of an electric drive, wherein the arrangement comprises:
   two or more control means;
   two or more frequency converter modules;
   two or more loads;
   switching means for connecting the frequency converter modules to different loads of the arrangement, respectively;
   selection means for selecting active control means;
   first branching means and second branching means, the first branching means being configured to establish connections between each control means and one or more second branching means, and the second branching means being configured to establish connections between each frequency converter module and one or more first branching means in such a manner that the second branching means comprise at least one branching device arranged to establish a connection between a frequency converter module and two or more first branching means.

2. An arrangement as claimed in claim 1, wherein the frequency converter modules are configured to control alternatively a first motor or several motors having less power than the first motor.

3. An arrangement as claimed in claim 1, wherein the arrangement is an electric drive for use in ships.

4. An arrangement as claimed in claim 1, wherein connections between the control means and the first branching means, connections between the first branching means and the second branching means, and connections between the second branching means and the frequency converter modules are implemented by an optical fiber.

5. An arrangement as claimed in claim 1, wherein the branching means comprise one or more branching devices, the branching device comprising two passive optical Y branching units.

6. An arrangement as claimed in claim 1, wherein the branching means comprise one or more electric devices, the one or more devices being arranged to implement the functionality of one or more branching devices, the branching device comprising means for implementing the functionality of two optical Y branching units.

7. An arrangement as claimed in claim 1, wherein the means for selecting active control means is a selector, which is configured to select the control means to which electric power is supplied.

8. An arrangement as claimed in claim 1, wherein the first branching means comprise one or more electric devices, by which a connection between a control unit and two or more second branching means may be established.

9. An arrangement as claimed in claim 1, wherein each switching means is arranged to establish one connection between one frequency converter module and one load at a time.

10. An arrangement as claimed in claim 1, wherein the switching means are configured to operate responsive to the selection means.

11. An arrangement as claimed in claim 1, wherein the second branching means are configured to operate responsive to the selection means.

12. An arrangement as claimed in claim 1, wherein the first branching means and the second branching means are integrated into a device that is arranged to implement the functionality of both branching means.

13. An arrangement as claimed in claim 1, wherein the arrangement comprises, selectable by the selection means:
    a first operating mode, in which the frequency converter modules are connected to supply a ship propeller drive; and
    a second operating mode, in which each frequency converter module is connected to its own motor, the motors being arranged to rotate a belt conveyor drive used for unloading cargo.

14. A method for controlling frequency converter modules in connection with an electric drive arrangement, the arrangement including two or more control means, two or more frequency converter modules, two or more loads, and one or more switching means for connecting the frequency converter modules to the different loads of the arrangement, wherein the method comprises the steps of:
    selecting active control means by which the frequency converter modules are controlled;
    selecting loads loading the frequency converter modules by means of the switching means;
    establishing a connection between each control means and one or more frequency converter modules for controlling the frequency converter modules by branching the connection from each control means to one or more connections and combining one or more afore-mentioned branched connection into one connection to the frequency converter module; and
    controlling the frequency converter modules loaded by the loads by means of the control means.

15. An arrangement as claimed in claim 2, wherein the arrangement is an electric drive for use in ships.

16. An arrangement as claimed in claim 15, wherein connections between the control means and the first branching means, connections between the first branching means and the second branching means, and connections between the second branching means and the frequency converter modules are implemented by an optical fiber.

17. An arrangement as claimed in claim 16, wherein the branching means comprise one or more branching devices, the branching device comprising two passive optical Y branching units.

18. An arrangement as claimed in claim 17, wherein the branching means comprise one or more electric devices, the one or more devices being arranged to implement the functionality of one or more branching devices, the branching device comprising means for implementing the functionality of two optical Y branching units.

19. An arrangement as claimed in claim 18, wherein the means for selecting active control means is a selector, which is configured to select the control means to which electric power is supplied.

20. An arrangement as claimed in claim 19, wherein the first branching means comprise one or more electric devices, by which a connection between a control unit and two or more second branching means may be established.

21. An arrangement as claimed in claim 20, wherein each switching means is arranged to establish one connection between one frequency converter module and one load at a time.

22. An arrangement as claimed in claim 21, wherein the switching means are configured to operate responsive to the selection means.

23. An arrangement as claimed in claim 22, wherein the second branching means are configured to operate responsive to the selection means.

24. An arrangement as claimed in claim 23, wherein the first branching means and the second branching means are integrated into a device that is arranged to implement the functionality of both branching means.

* * * * *